US008173060B2

(12) United States Patent
Kruglick

(10) Patent No.: US 8,173,060 B2
(45) Date of Patent: May 8, 2012

(54) METHODS OF MANUFACTURING DIRECTIONAL CONDUCTIVITY NANOCOMPOSITE MATERIALS

(75) Inventor: Ezekiel J. J. Kruglick, Poway, CA (US)

(73) Assignee: Empire Technology Development LLC, Wilmington, DE (US)

( * ) Notice: Subject to any disclaimer, the term of this patent is extended or adjusted under 35 U.S.C. 154(b) by 418 days.

(21) Appl. No.: 12/426,097

(22) Filed: Apr. 17, 2009

(65) Prior Publication Data

US 2010/0264033 A1 Oct. 21, 2010

(51) Int. Cl.
B29C 70/88 (2006.01)
(52) U.S. Cl. ......... 264/437; 264/1.36; 264/1.7; 264/440
(58) Field of Classification Search .......... 264/437–440, 264/1.36, 1.7, 340, 344; 205/80; 204/450, 204/456
See application file for complete search history.

(56) References Cited

U.S. PATENT DOCUMENTS 5,093,050 A * 3/1992 Tepic ............................ 264/415
2009/0091065 A1 * 4/2009 Katti et al. ................... 264/465

OTHER PUBLICATIONS

Dujardin, Bio-inspired Materials Chemistry, Advanced Materials Progress Report, Jun. 5, 2002, pp. 775-788, vol. 14, No. 11, Wiley-VCH Verlag GmbH, D-69469 Weinheim, 2002.

Liu, Studying the Size/Shape Separation and Optical Properties of Silver Nanoparticles by Capillary Electrophoresis, Journal of Chromatography A, 1062 (2005) 139-145.
Huang, In situ Templating of PbS Nanorods in Reverse Hexagonal Liquid Crystal, Colloids and Surfaces A: Physiochem. Eng. Aspects 247 (2004) 55-60.
Dolle, Live Scanning Electron Microscope Observations of Dendritic Growth in Lithium/Polymer Cells, Electrochemical and Solid-State Letters, 5 (12) A286-A289 (2002).
Electrophoresis, Wikipedia, Apr. 8, 2009.
Gorby, Electrically Conductive Bacterial Nanowires Produced by Shewanella oneidensis Strain MR-1, PNAS, Jul. 25, 2006, pp. 11358-11363, vol. 103, No. 30.
Zhang, Cadmium Sulfide Nanorods Formed in Microemulsions, Colloids and Surfaces A:Physiochem, Eng. Aspects 257-258 (2005) 497-501.

* cited by examiner

Primary Examiner — Mathieu D. Vargot
(74) Attorney, Agent, or Firm — Jensen & Puntigam, P.S.

(57) ABSTRACT

A directional conductivity nanocomposite material, apparatuses and processes for making such material are generally described. A directional conductivity nanocomposite material may comprise a supporting material such as ceramic or polymer, with directionally conductive nanorod structures running through the supporting material. The material may be made by orienting nanorods in an electrophoretic gel using an electrical or magnetic field to align the nanorods, removing the gel, reinforcing the nanorods, and flowing in supporting material.

17 Claims, 8 Drawing Sheets

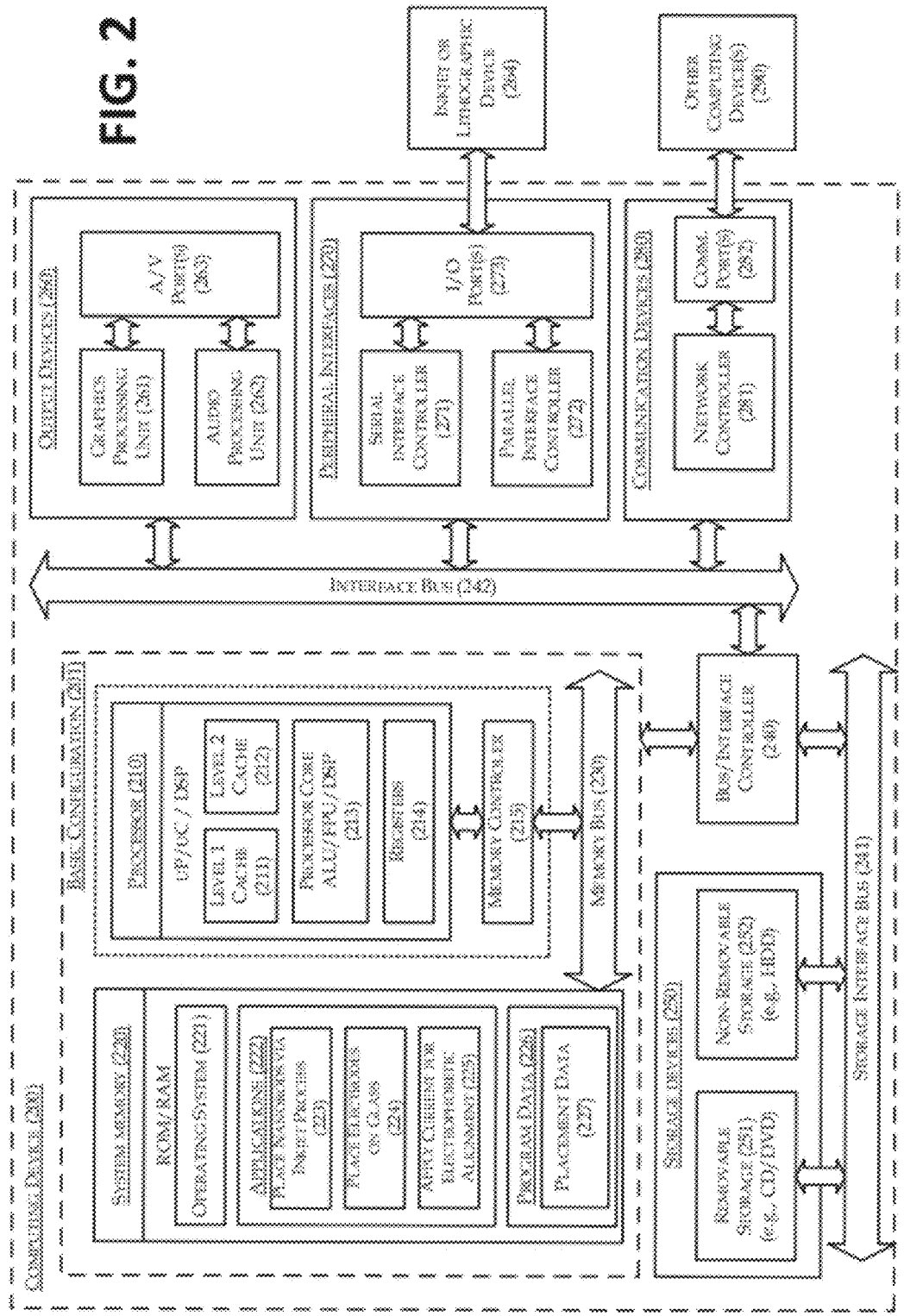

METHODS OF MANUFACTURING DIRECTIONAL CONDUCTIVITY NANOCOMPOSITE MATERIALS

BACKGROUND

Nanotechnology encompasses a set of tools and methods that scientists use to see, measure, and precisely control matter, sometimes moving just one atom at a time. Nanotechnology generally involves but is not limited to development and use of materials or devices with structures of the size 100 nanometers or smaller. Nanotechnology may for example use "bottom-up" approaches, in which materials and devices are built from molecular components, and "top-down" approaches, in which nano-objects are constructed from larger entities.

A number of physical phenomena become pronounced as the size of a system decreases, including statistical mechanical effects and quantum mechanical effects (for example, the "quantum size effect," where greatly reducing particle size alters the electronic properties of solids). In addition, a number of physical (mechanical, electrical, optical, etc.) properties change in a nanoscale system as compared to macroscopic systems. Materials reduced to the nanoscale can show different properties compared to what they exhibit on a macroscale, enabling unique applications. For instance, opaque substances become transparent (copper), stable materials become combustible (aluminum), solids turn into liquids at room temperature (gold), and insulators become conductors (silicon). A material such as gold, which is chemically inert at normal scales, can serve as a potent chemical catalyst at nanoscales.

In nanotechnology, a particle may be defined as a small object that behaves as a whole unit in terms of its transport and properties. Nanoparticles may or may not exhibit size-related properties that differ significantly from those observed in fine particles or bulk materials. One type of nanoparticle is a nanocluster, which may exhibit but is not limited to dimensions between 1 and 10 nanometers and a narrow size distribution. Nanocluster shapes include nanospheres, nanorods, and nanocups, among many others.

Oblong nanorods have become a readily available commodity. Metal nanorods can be made in the laboratory by aging Cadmium Sulfide (CdS) particles, or by the action of the bacteria *shewanella oneidensis*. They are also commercially available in gold, permalloy, nickel, zinc oxide, and a number of other conductive materials. Nanorods have a range of potential uses, including display technologies, microelectromechanical systems, optical, sensing, solar cells, magnetic and electronic device applications.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
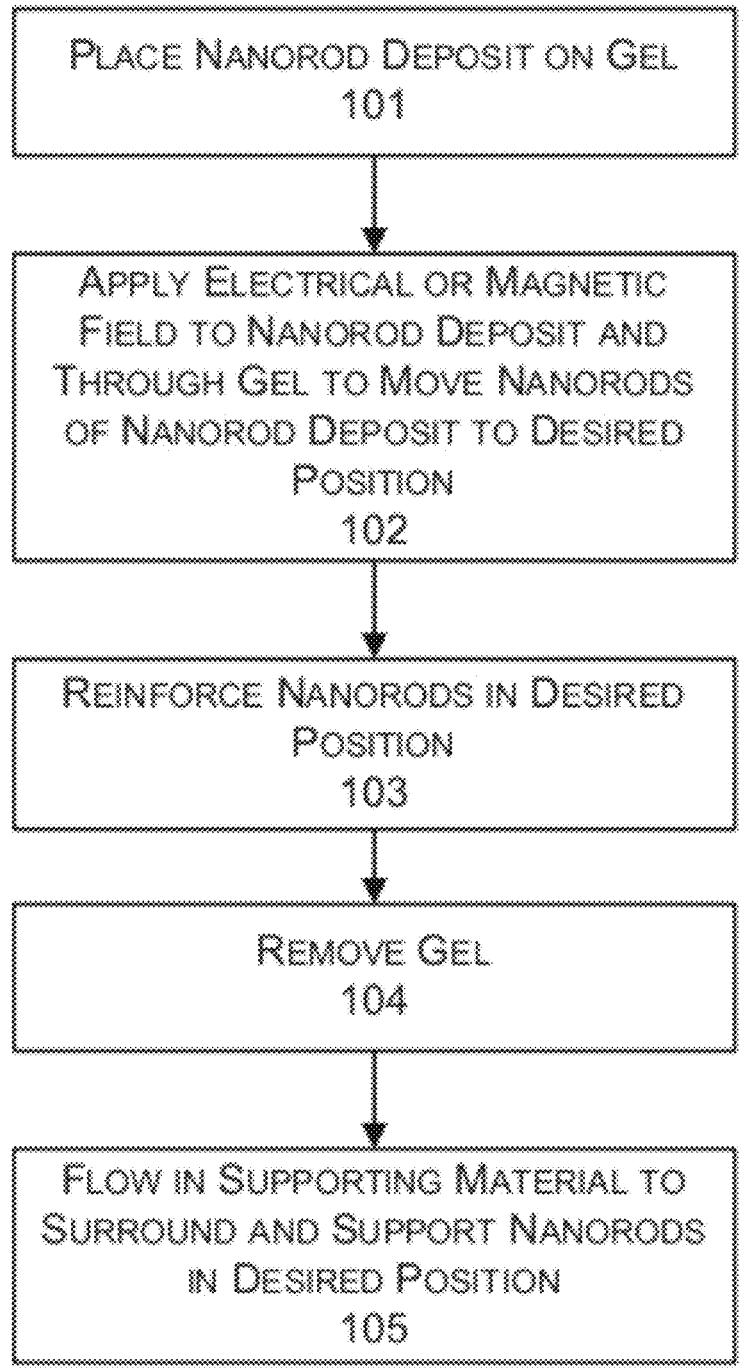
FIG. 1 is a flow diagram illustrating an example method for manufacturing a directional conductivity nanocomposite material.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, may be arranged, substituted, combined, and designed in a wide variety of different configurations, all of which are explicitly contemplated and made part of this disclosure.

The present disclosure describes systems and methods for manufacturing a solid structure with embedded joined nanorods that provide directional thermal and electrical conductivity.

Nanorods offer an opportunity to fabricate complex metal structures with directional conductivity. The ability to precisely align and pattern the nanorods has until recently been a limiting factor. However, electrophoresis—the same process used to process and align DNA samples—may also be used to align and move metallic nanorods. Similarly, magnetic or other forces may be used for the same purpose. These processes open up new possibilities for creating metal structures that may then be strengthened and embedded in a polymer or other solid substance to create products such as interposers, Radio Frequency (RF) or microwave circuits, and printed circuit boards. Currently, these and similar products are made by drilling through a solid substance and placing metal into the drilled holes, which makes it more difficult to spread the electrical connections. By contrast, aligning a series of nanorods and building a solid material around them allows for the creation of flexible sheets of directionally conductive materials, with conduction that may be radial or cone-shaped.

FIG. 1 is a flow diagram illustrating an example method for manufacturing a directional conductivity nanocomposite material in accordance with the present disclosure. In the method illustrated in FIG. 1, the method includes operations 101-105. Operations 101-105 include a "Place Nanorod Deposit on Gel" operation 101, an "Apply Electrical or Magnetic Field to Nanorod Deposit and Through Gel to Move Nanorods of Nanorod Deposit to Desired Position" operation 102, a "Reinforce Nanorods in Desired Position" operation 103, a "Remove Gel" operation 104, and a "Flow in Supporting Material to Surround and Support Nanorods in Desired Position" operation 105.

In FIG. 1, operations 101-105 are illustrated as being performed sequentially, with operation 101 first and operation 105 last. It will be appreciated however that these operations may be re-ordered as convenient to suit particular embodiments, and that these operations or portions thereof may be performed concurrently in some embodiments.

In a "Place Nanorod Deposit on Gel" operation 101, one or more nanorod deposits, each deposit comprising a number of nanorods, may be placed onto the first surface of an electrophoretic gel. Any placement technique may be used. Example placement techniques include using a thermal inkjet or photolithographic placement process.

Nanorods comprise, in general, oblong structures synthesized from metals or semiconducting materials, with widths of 100 nanometers or less (1 nanometer=$1\times10^{-9}$ meters) and lengths 3-5 times the width. However, the term nanorod as used herein should not be construed as limited to this size range. Nanorods may be purchased commercially or created through simple laboratory processes such as aging CdS particles or manipulating the bacteria *shewanella oneidensis*. Commercial nanorods may be made of gold, permalloy, nickel, zinc oxide, iron, cobalt, or silver, for example, or of a number of other metals with varying conductive properties.

There are a variety of available options for placing nanorods in a desired position on a surface such as a surface of an electrophoretic gel. In some example embodiments, a photolithographic process may be used. In an example photolithographic process, a thin layer of substrate may be placed onto a flat surface and then selectively removed via a series of chemical processes, leaving a desired pattern on the surface. This process may use light to transfer a geometric pattern from a photomask to a light-sensitive chemical on the substrate. A series of chemical treatments may then be applied to engrave the exposure pattern into the material underneath the photoresist. Advantages of photolithography may include that photolithography permits exact control over the shape and size of the objects it creates, and that it may create patterns over an entire surface simultaneously. Disadvantages include that photolithography may require a flat substrate to start with, and it is more difficult to apply to shapes that are not flat.

In another example embodiment, inkjet technology may be used to place nanorods in a desired position on a surface. Inkjet technology printing offers a versatile and low-cost microfabrication capability that may be used to pattern a variety of liquids including polymers, proteins, and various solvents. Inkjet inks may be fused with nanostructures such as nanowires, nanotubes, and quantum dots and used for non-contact patterning onto rigid, flexible, rough, smooth, and 3-D substrates. The process is accurate, fast, high resolution, and consumes very little material as compared to a lithographic process, since the inkjet process places the material only where it is needed whereas the lithographic process puts the material down over the whole substrate and then etches most of it away.

An electrophoretic gel may comprise a cross linked conducting polymer with a porous structure. The gel may be of varying composition and porosity to suit the weight and composition of the substance being aligned in the gel. When conductive nanorods are placed onto the gel and an electric or magnetic force is applied, the nanorods will migrate from the deposited end of the gel and disperse throughout the gel in a pattern determined by the location of the force.

In an "Apply Electrical or Magnetic Field to Nanorod Deposit and Through Gel to Move Nanorods of Nanorod Deposit to Desired Position" operation 102, a first electrode may be placed substantially over the nanorod deposit, with a second electrode placed on a side of the gel opposite the nanorod deposit. In some embodiments, magnetic or other forces may be used instead of electricity, such as in the case of magnetic rods such as Nickel-Iron (Ni—Fe) nanorods, or in adjustable scenarios where the magnetic force may be used to tune electrical properties while current is still flowing. If electrodes are used, the first electrode may be placed beneath a sheet of glass, and the second electrode may be placed on top of a sheet of glass, both of which may be connected to an electrical or other apparatus that may be controlled by a computing device. Upon applying an electrical or magnetic field via the apparatus, the nanorods may orient parallel to the direction of the electrical or magnetic field in the gel. The field may provide a force and the gel may provide resistance, so that an oblong object will be pulled into the position of least motional resistance and aligned along a potential. Alternating polarity, reversing the electrical or magnetic field one or more times, may be used to pull the nanorods back and forth to evenly distribute them. Depending on the placement of the electrodes, the nanorods may form a substantially straight line through the gel. The line can advantageously be at any angle with respect to the gel. The line can be perpendicular to a surface of the gel, but can also be at non-perpendicular angles, e.g., at an angle between 0 and 90 degrees from perpendicular to a surface of the gel on which the nanorod deposit was placed, exclusive of 0 and 90. For example, the line of nanorods may be from 0.000000 degrees (or slightly off perpendicular to a surface) to 89.9999999 degrees (or nearly parallel to a surface).

Once the nanorods are in the desired position, in some embodiments they may be left in the gel. The gel may have markedly lower electrical and thermal resistance in the direction parallel to the rods than in the direction perpendicular to the rods due to conduction along the rods. This approach may have fairly low resistance in the conduction direction and fairly high insulation in other directions, and may have the advantage of being reversible and controllable, allowing the conductivity of the gel to be rapidly altered.

In a "Reinforce Nanorods in Desired Position" operation 103, the nanorods may be strengthened through the use of a stiffening process such as dendritic growth or electroplating. This operation contemplates a permanent structure, rather than the reversible structure described in operation 102. In some embodiments, operations 102 and 103 may be repeated with the electrical or magnetic force aligned in a different direction to form complex structures in which some of the aligned nanorods are not parallel to others of the aligned nanorods.

Dendritic growth describes a process of using pulsed current to induce metal dendrite growth. Most light metals, particularly lithium, will exhibit dendritic growth when induced by purposeful reaction kinetics. The gel may also aid the dendrite growth process if it is mixed to contain metallic electrolytes. The dendrites may grow in complex geometric shapes and establish connections between the nanorods, allowing for a pure metal connection from one end of the bulk to the other. Dendritic growth may require that an appropriate gel with dissolved metal be used for the entire process. Because the structure will no longer be reversible, the gel may later be replaced with another structure to provide insulation in the non-conducting directions and to provide long-term structural support to the reinforced rod structures.

Electroplating, or electrodeposition, involves using electrical current to reduce positively charged ions of a desired material from a solution and coat a conductive object with a thin layer of the material. Another embodiment may involve electroless deposition, which may not require an external source of electrical current. These processes may apply coatings of a generally uniform thickness without porosity and allow complex fabricated objects to be coated on both the inside and outside surfaces. The described processes may be applicable to a wide range of materials, such as metals, ceramics, polymers, etc.

In a "Remove Gel" operation 104, the electrophoretic gel may be dissolved by, for example, one or more of introducing a solvent and increasing pressure on the gel. One commonly used method is a dissolve-in-place "sol-gel" wet-chemical process (Chemical Solution Deposition). The sol-gel process may start either from colloidal particles or from a chemical solution (sol) to produce an integrated network (gel). A drying process may remove the liquid phase from the gel, forming a porous material. The precursor sol may be deposited on a substrate to form a film, or may be cast into a suitable container with the desired shape to obtain, for example, ceramics, glasses, fibers, membranes, or aerogels. Supercritical drying may be used to prevent surface tension from collapsing the nanorod structures until the supporting material is flowed in.

After the gel has been removed, another round of dendritic growth or electrodeposition/electroless deposition may be performed to further enlarge and strengthen the aligned nanorod structures.

In a "Flow in Supporting Material to Surround and Support Nanorods in Desired Position" operation 105, the space that previously held the gel may be filled with a substance such as aero-gel (for lightness), polymers (for flexibility), or ceramics (for structural stiffness), which will surround and embed the nanorods in a desired position. In some embodiments, the material may form part of a microchip interposer, which is an electrical interface routing between the small structure of a chip and the larger structure of pins to which the chip is coupled.

Figure 2:
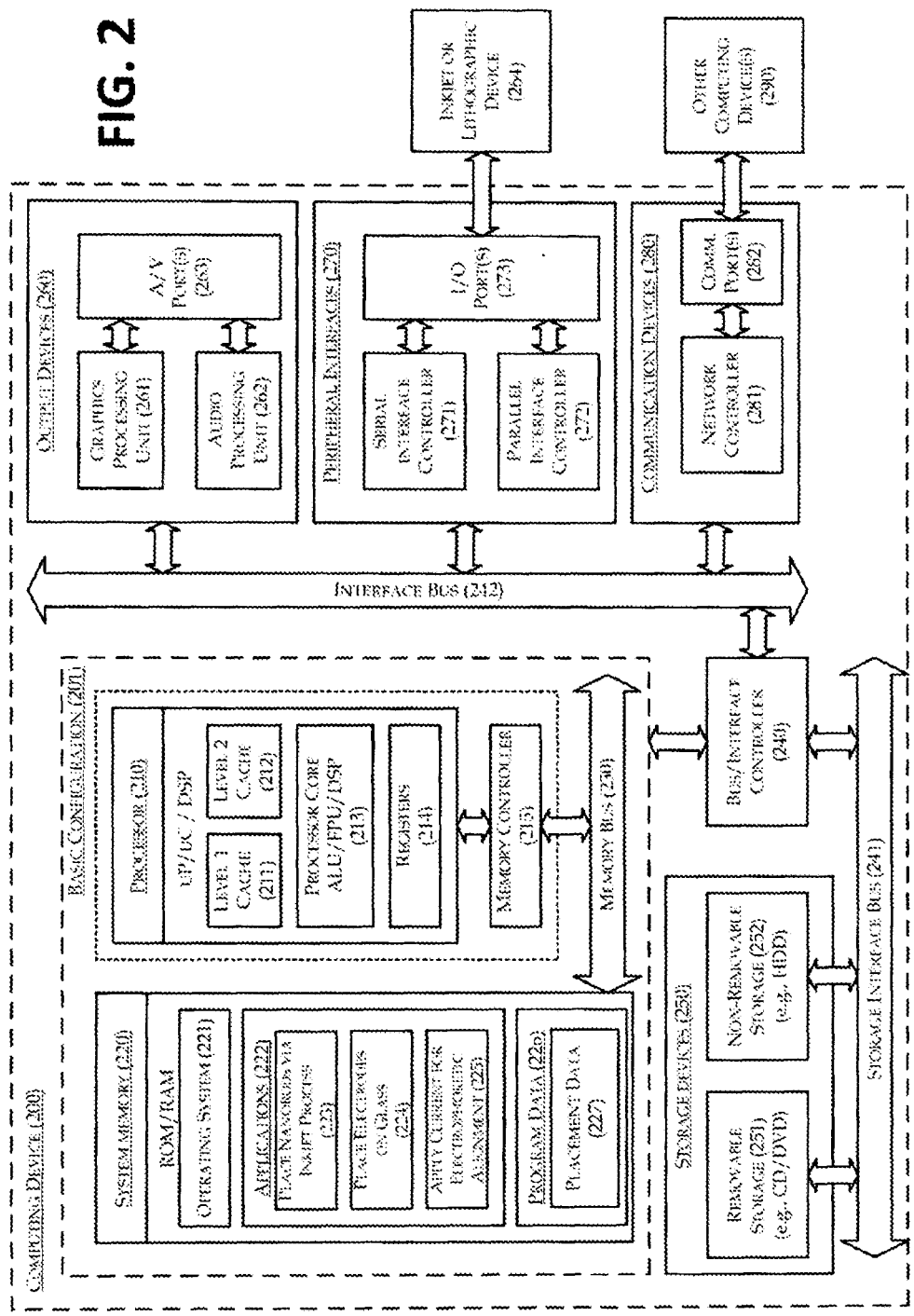
FIG. 2 is a block diagram illustrating a computing device 200 as one example of a device that may control one or more operations.
Figure 3A:
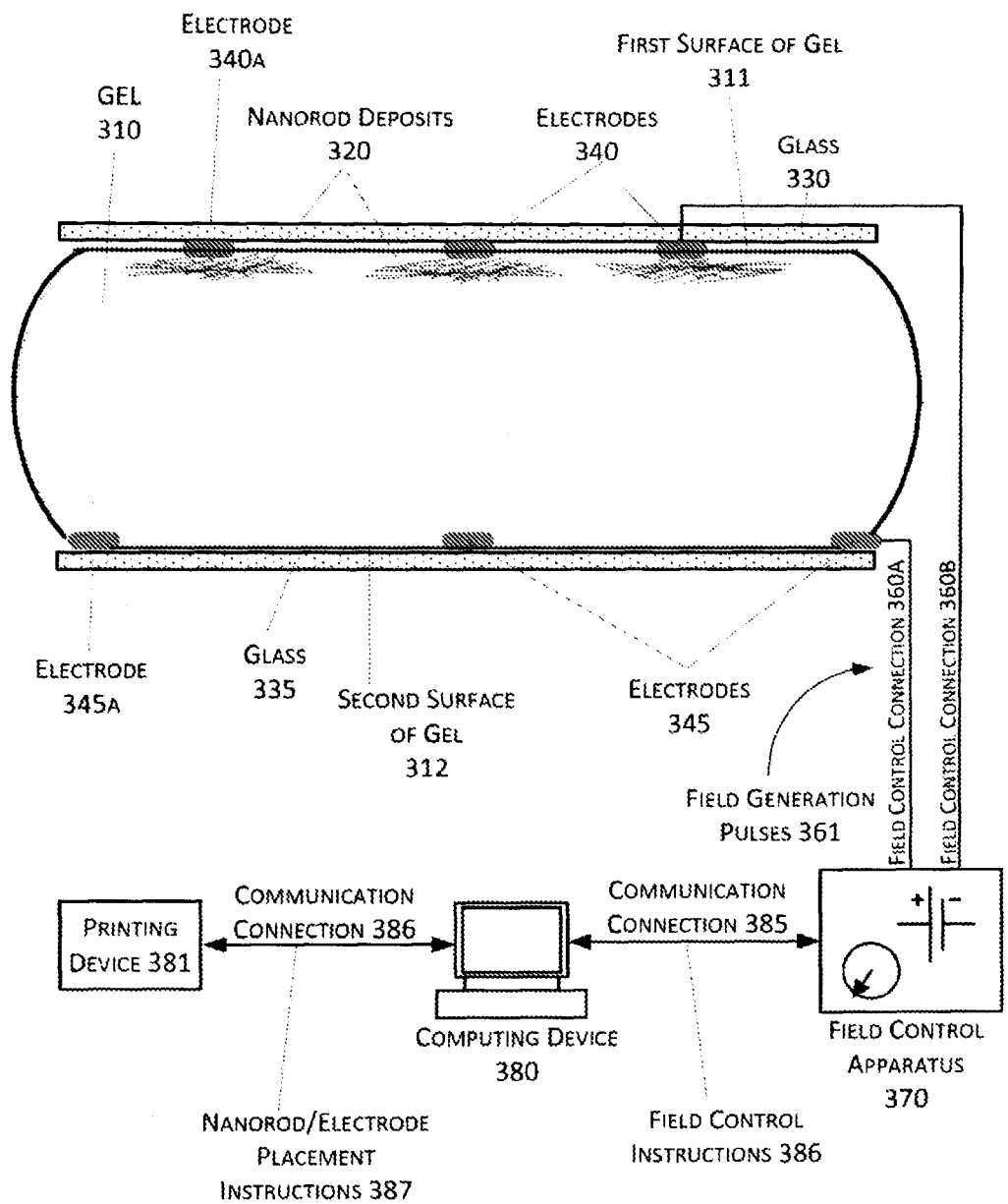
Figure 3B:
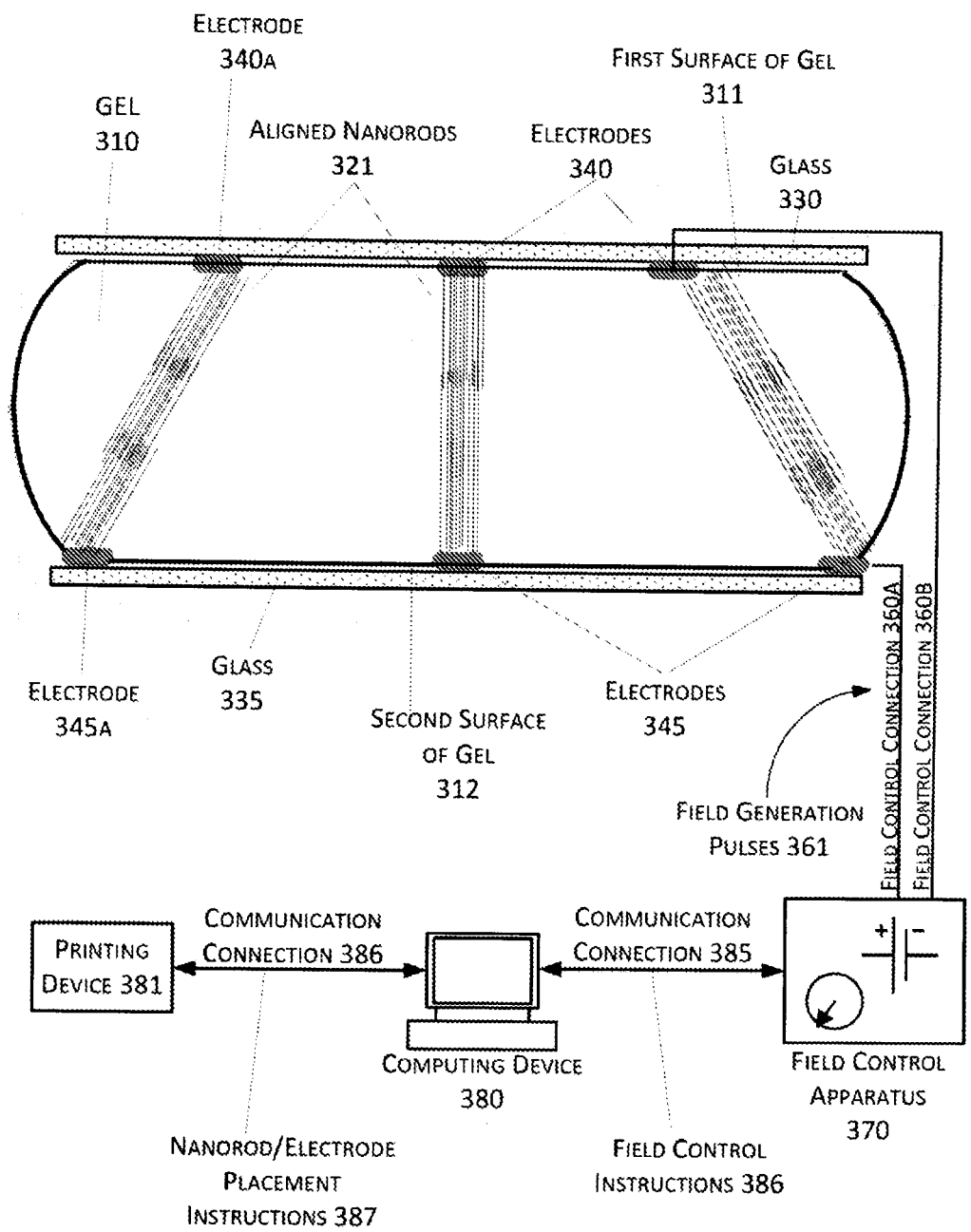
Figure 3C:
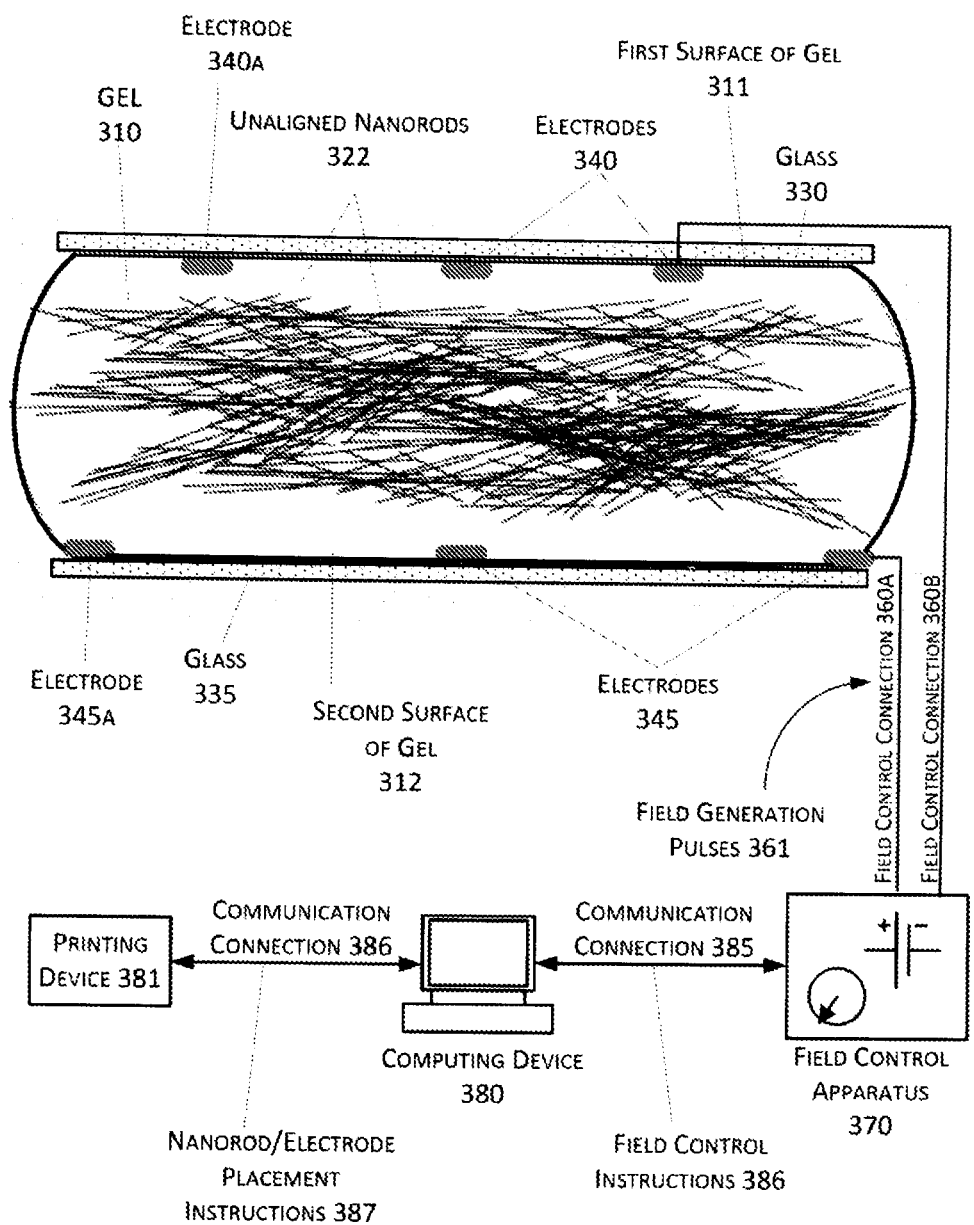
Figure 3D:
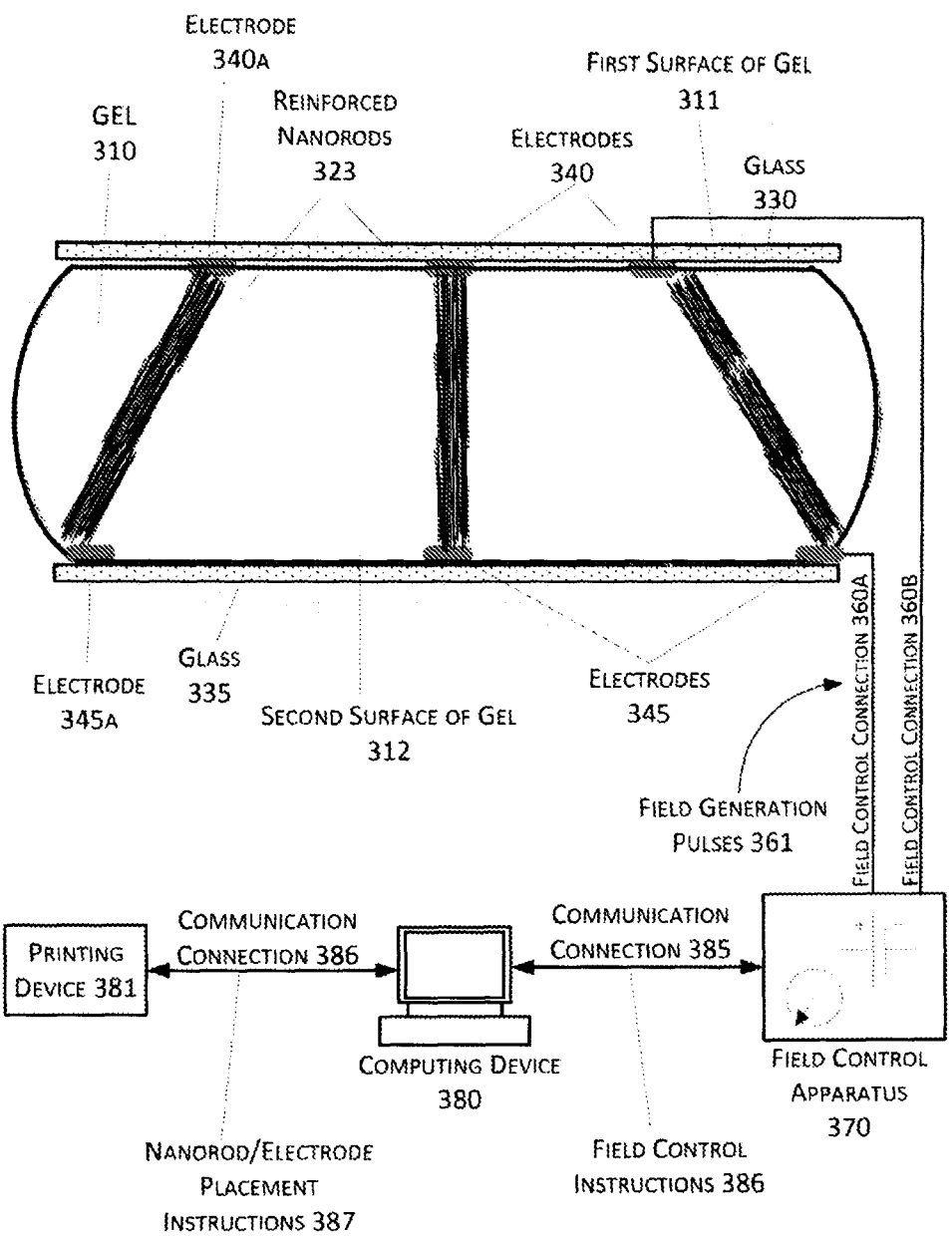
Figure 3E:
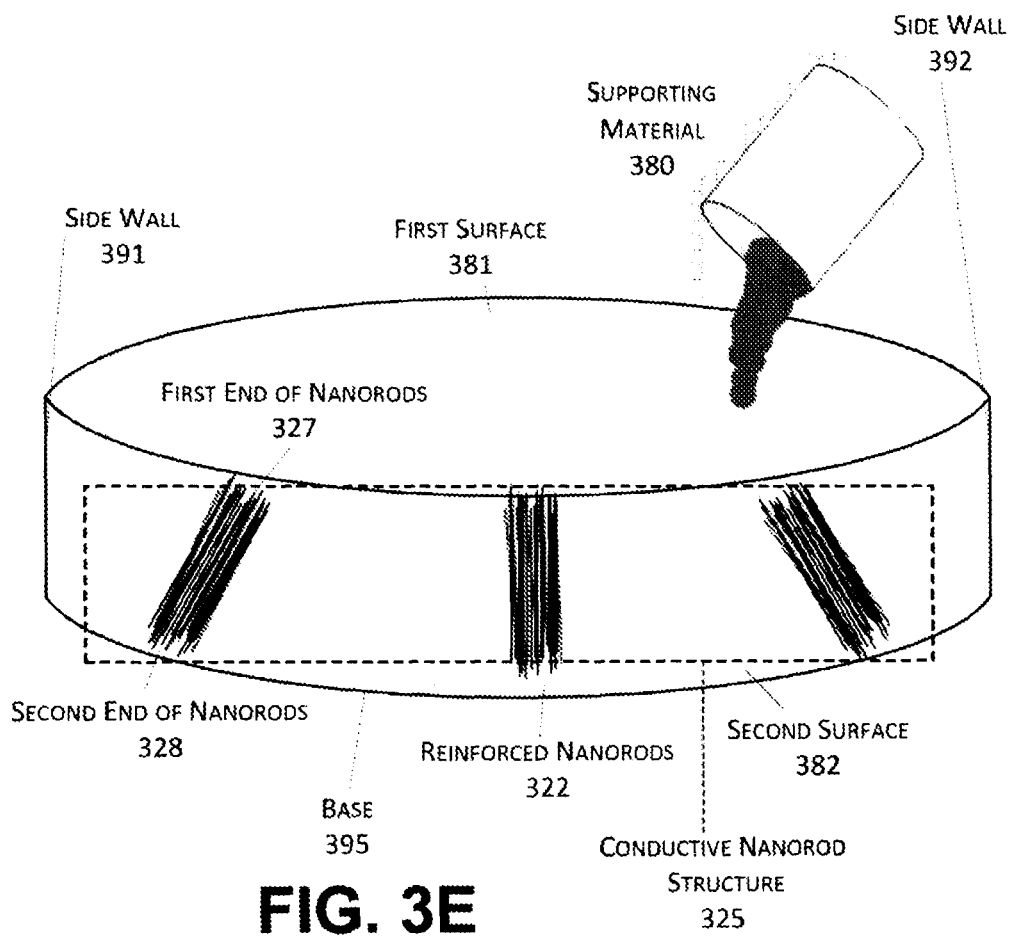
Figure 4:
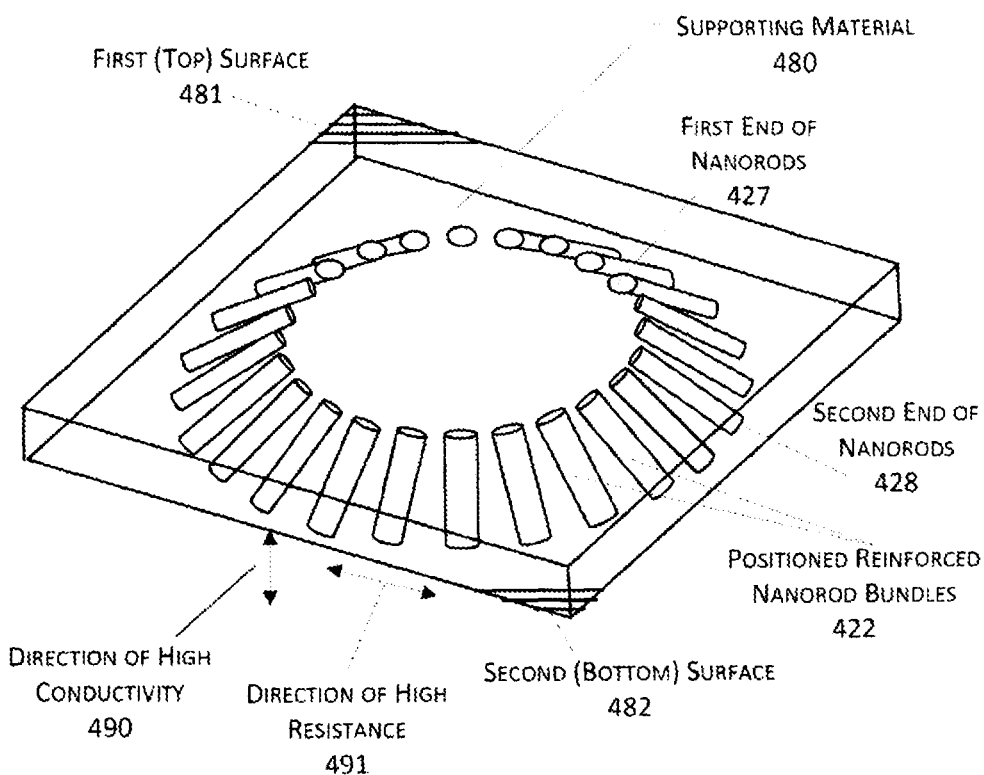

FIG. 2 is a block diagram illustrating a computing device 200 as one example of a device that may control one or more of operations in accordance with the present disclosure. For example, operations for the flow diagram of FIG. 1 may be performed by computing device 200 including, but not limited to, placing the nanorods into the gel 223, placing the electrodes onto the glass 224, and applying a current for electrophoretic alignment 225. In a very basic configuration 201, computing device 200 typically includes one or more processors 210 and system memory 220. A memory bus 230 may be used for communicating between the processor 210 and the system memory 220.

Depending on the desired configuration, processor 210 may be of any type including but not limited to a microprocessor (µP), a microcontroller (µC), a digital signal processor (DSP), or any combination thereof. Processor 210 may include one or more levels of caching, such as a level one cache 211 and a level two cache 212, a processor core 213, and registers 214. The processor core 213 may include an arithmetic logic unit (ALU), a floating point unit (FPU), a digital signal processing core (DSP Core), or any combination thereof. A memory controller 215 may also be used with the processor 210, or in some implementations the memory controller 215 may be an internal part of the processor 210.

Depending on the desired configuration, the system memory 220 may be of any type including but not limited to volatile memory (such as RAM), non-volatile memory (such as ROM, flash memory, etc.), or any combination thereof. System memory 220 typically includes an operating system 221, one or more applications 222, and program data 226. As discussed above, applications 223-225 may include, for example, placing nanorods onto an electrophoretic gel, placing electrodes onto a sheet of glass, and applying an electrical or magnetic force to electrophoretically disperse and align the nanorods in a desired position. Program data 226 may include, for example, nanorod and/or electrode placement data 227 that is used by applications 223-225.

Computing device 200 may have additional features or functionality, and additional interfaces to facilitate communications between the basic configuration 201 and any required devices and interfaces. For example, a bus/interface controller 240 may be used to facilitate communications between the basic configuration 201 and one or more data storage devices 250 via a storage interface bus 241. The data storage devices 250 may be removable storage devices 251, non-removable storage devices 252, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives, to name a few. Example computer storage media may include volatile and nonvolatile, removable and non-removable media implemented in any method or technology for storage of information, such as computer readable instructions, data structures, program modules, or other data.

System memory 220, removable storage 251, and non-removable storage 252 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that may be used to store the desired information and that may be accessed by computing device 200. Any such computer storage media may be part of device 200.

Computing device 200 may also include an interface bus 242 for facilitating communication from various interface devices (e.g., output interfaces, peripheral interfaces, and communication interfaces) to the basic configuration 201 via the bus/interface controller 240. Example output devices 260 include a graphics processing unit 261 and an audio processing unit 262, which may be configured to communicate to various external devices such as a display or speakers via one or more A/V ports 263. Example peripheral interfaces 270 include a serial interface controller 271 or a parallel interface controller 272, which may be configured to communicate with external devices such as input devices (e.g., keyboard, mouse, pen, voice input device, touch input device, etc.) or other peripheral devices (e.g., printer, scanner, etc.) via one or more I/O ports 273. For example, in this embodiment, an inkjet or lithographic device 264 may be connected via an I/O port and used to deposit bundles of nanorods onto a gel or other surface. An example communications device 280 includes a network controller 281, which may be arranged to facilitate communications with one or more other computing devices 290 over a network communication via one or more communication ports 282.

The communications connection is one example of a communication media. Communication media may typically be embodied by computer readable instructions, data structures, program modules, or other data in a modulated data signal, such as a carrier wave or other transport mechanism, and include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared (IR), and other wireless media.

Figure 3A:
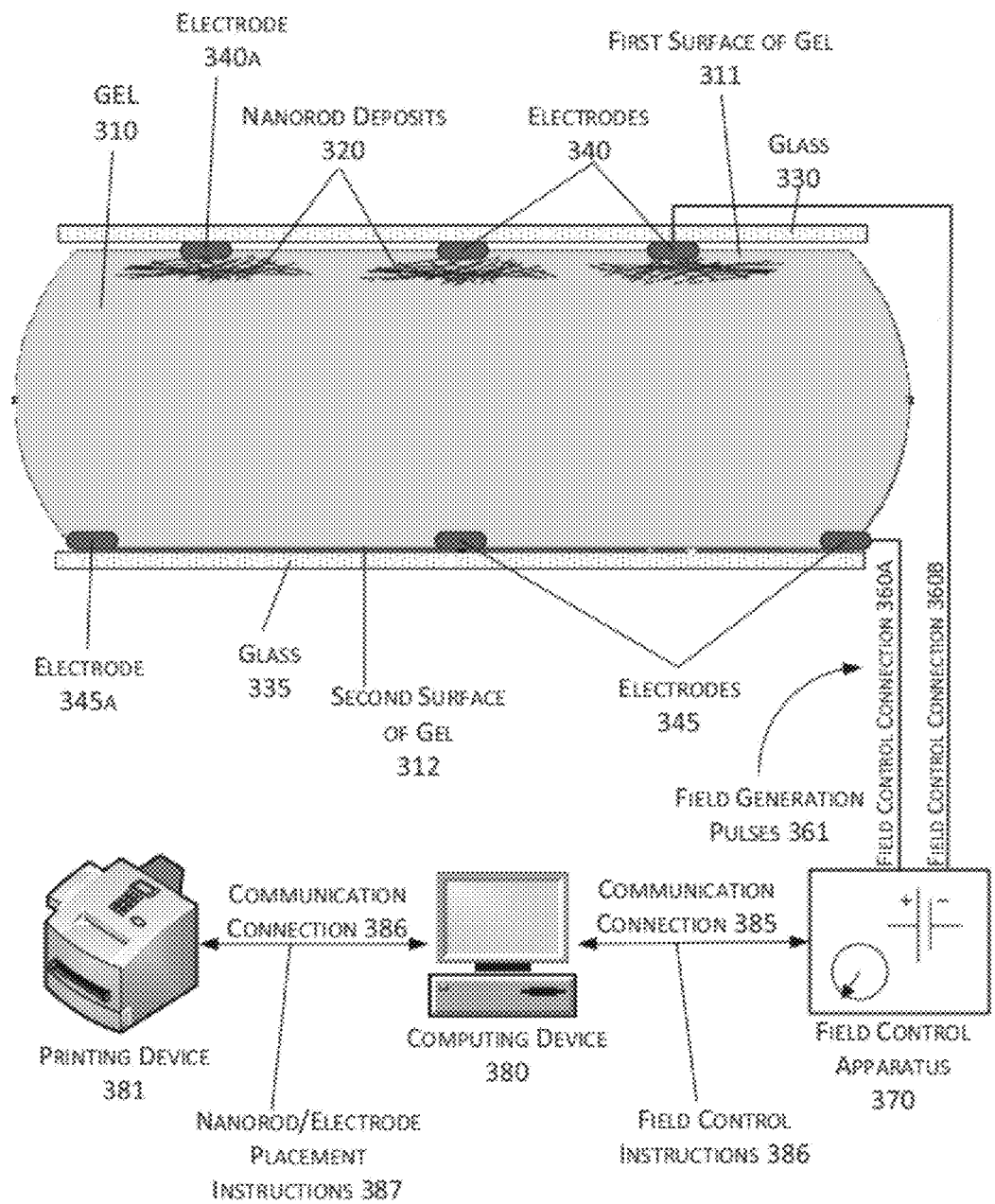
FIG. 3A is a diagram illustrating an example apparatus/method that may carry out one or more operations in connection with producing a directional conductivity nanocomposite material.

FIG. 3A is a diagram illustrating an example apparatus/method that may carry out one or more operations in accordance with the present disclosure. FIG. 3A comprises an electrophoretic gel 310 with a first surface 311 and a second surface 312, nanorod deposits 320, sheets of glass 330 and 335, electrodes 340 and 345, including an example electrode pair 340A and 345A, field control connections 360A and 360B, which transmit field generation pulses 361, apparatus 370, wired or wireless communication connection 385 which may transmit field control instructions/commands 386, computing device 380, wired or wireless communication connection 382 which may transmit nanorod/electrode placement instructions/commands 387, and printing device 381.

In FIG. 3A, several nanorod deposits 320 have been placed onto the first surface 311 of the electrophoretic gel 310. Electrodes 340 disposed on the glass 330 have been positioned over the nanorod deposits 320, and under the second surface of the gel 312 are additional electrodes 345 which may be disposed on another sheet of glass 335. Electrodes 340 and 345 are connected via field control connections 360A and 360B to an apparatus 370 controlling electrical or magnetic fields between pairs of electrodes such as example electrode pair 340A and 345A, in which a first electrode 340A of the pair is disposed on the first surface 311, and a second electrode 345A of the pair is disposed on the second surface 312. Apparatus 370 also is connected via a wired or wireless communication connection 385 to a computing device 380, which may be connected via another wired or wireless communication connection 382 to a printing device 381. The computing device 380 and printing device 381 may be used to carry out one or more of the operations described herein, including but not limited to those operations described previously with respect to FIG. 1.

Field control connections 360A and 360B may be used to transmit electrical field generation pulses 361 to electrodes 340 and 345, establishing an electrical potential difference between paired electrodes such as example pair 340A and 345A, the electrical potential difference creating an electrical field between the various electrode pairs along which the nanorods may be distributed. In some embodiments, field control connections 360A and 360B may comprise, for example, wires or wire pairs such as parallel or twisted pair wire connections. Field control connections 360A and 360B may also comprise other connections for controlling an electrical field between electrodes, such as cables or wireless communications connections. Field control connections 360A and 360B may run separately to each controlled electrode, or may be attached to a communal connection associated, for example, with all of the electrodes on glass 335, with either appropriate switching to control individual electrodes, or an arrangement in which all electrodes on the glass 335 are subject to a same electrical potential at a same time. The field generation pulses 361 may be generated by apparatus 370, for example, in some embodiments, by applying an alternating voltage, via field control connections 360A and 360B, to electrodes 340 and electrodes 345. The strength of the alternating voltage and alternation timing may vary depending on desired rod displacement.

Wired or wireless communication connection 385 may be used to transmit field control instructions 386 from computing device 380 to apparatus 370. In some embodiments, communication connection 385 may be omitted, for example where appropriate controls may be included on the apparatus 370. In other embodiments, a user interface at computer 380 may allow for software control and specification of desired electrical field properties. User-determined field properties may be converted by computer 380 to field control instructions 386 which may include a voltage which is amplified by apparatus 370, or may include more sophisticated control information which is interpreted and applied by the apparatus 370.

Wired or wireless communication connection 382 may be used to transmit placement instructions 387 from computing device 380 to printing device 381, such as instructions on where to deposit one or more bundles of nanorods 320 on the first surface of the gel 311, and where to deposit one or more electrodes, e.g., 340, on glass, e.g., 330. Appropriate software may implement a user interface at computer 380 which may allow for software control and specification of electrode and/or nanorod placement, and which may then generate and send placement instructions 387 to printing device 381.

In FIG. 3A, the electrical or magnetic field has not yet been activated and the nanorods 320 are positioned in the locations where they were deposited via an inkjet or lithographic printing device 381 or by another method on top of the first surface 311 of the gel 310. A computing device 380 may be used to control the operation of the printing device 381 by transmitting nanorod placement instructions 387 via cable 382 to determine the precise placement of the nanorod deposits 320. The computing device 380 also may be used to determine the placement of electrodes 340 and electrodes 345 on the first 311 and second 312 surfaces of the gel 310 and to transmit electrode placement instructions 387 via cable 382; further, computing device 380 may be used to determine the amount and duration of electrical or magnetic force to be applied via apparatus 370 and to transmit field control instructions 386 via cable 385. This computing device 380 may be the computing device 200 depicted in FIG. 2, configured to calculate and store nanorod and/or electrode placement data and to carry out applications 223-225 as described previously. The printing device 381 may be an inkjet or lithographic device 264 as depicted in FIG. 2.

In some alternative embodiments, the placement of electrodes 340 and 345 may be accomplished without the use of computing device 380, by manually calculating the necessary angles to achieve the desired distribution of nanorods. Additionally, apparatus 370 may be configured to carry out one or more of the operations otherwise performed by computing device 380, such as determining the desired placement of electrodes 340 and 345, or calculating the amount and duration of force required to position the nanorod deposits 320 into the desired configuration.

In some embodiments, a nonconductive, insulating substrate other than glass may be used in place of glass 330 and 335 to support and insulate the electrodes 340 and 345. In other embodiments, electromagnets may be used in place of electrodes 340 and 345. In further embodiments, a smaller or larger volume of gel may be used, resulting in a greater or lesser thickness of the aligned nanorods. The width and length of the illustrated gel 310 is merely for clear illustration; the gel 310 may be any appropriate thickness.

In further embodiments, electron microscopy or another form of magnification may be used to visualize and guide the nanorod placement and distribution process. An electron microscope uses electrons to illuminate a specimen and create an enlarged image. Electron microscopes have much greater resolving power than light microscopes and may obtain much higher magnifications—some electron microscopes may magnify specimens up to 2 million times, while the best light microscopes are limited to magnifications of 2,000 times.

In some embodiments, as alluded to above, the electrodes 340 and 345 may comprise electromagnets, creating magnetic fields rather than electric fields between the electrode pairs. Electrode or electromagnet pairs 340A and 345A must be properly synchronized to create the appropriate field between the electrodes of the pair, causing the nanorods to move into the desired configuration by aligning along the field created between the paired electrodes. The field generation pulses 361 may be tailored to reduce interference with other fields, to reduce nanorod migration or orientation in a wrong direction, or to intentionally introduce complex migration/orientation properties.

Figure 3B:
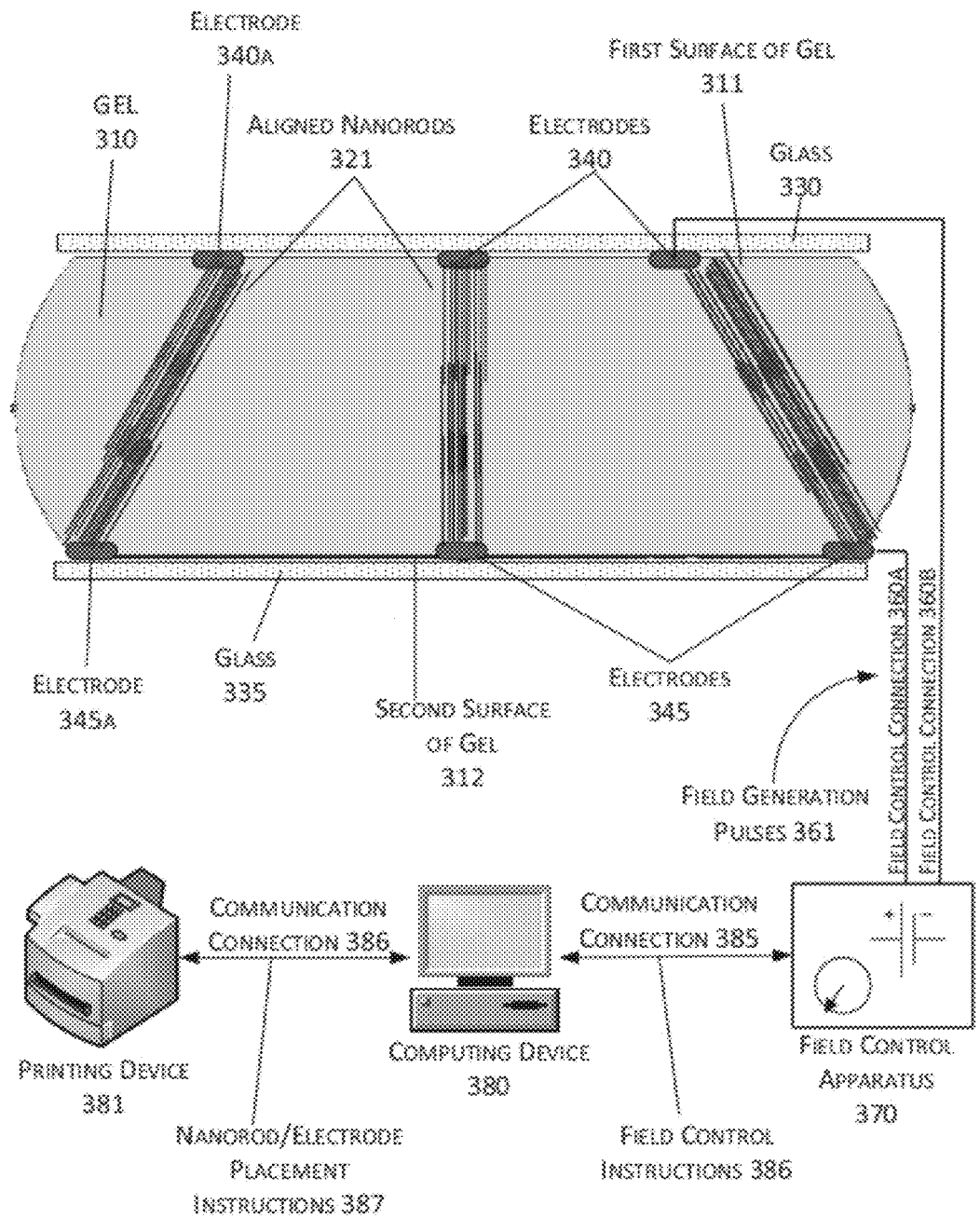
FIG. 3B is a diagram illustrating an example apparatus/method that may carry out one or more operations in connection with producing a directional conductivity nanocomposite material.

FIG. 3B is a diagram illustrating an example apparatus/method that may carry out one or more operations, as well as an example apparatus/method that may be used to adjust the thermal conductivity of a gel in accordance with the present disclosure. FIG. 3B comprises many of the same components as FIG. 3A, including an electrophoretic gel 310 with a first surface 311 and a second surface 312, sheets of glass 330 and 335, electrodes 340 and 345, including an example electrode pair 340A and 345A, field control connections 360A and 360B which transmit field generation pulses 361, apparatus 370, communication connection 385 which transmits field control commands 386, computing device 380, communication connection 382 which transmits nanorod/electrode placement commands 387, and printing device 381. FIG. 3B also includes aligned nanorods 321.

As in FIG. 3A, electrodes 340 and 345 are connected via field control connections 360A and 360B to an apparatus 370 controlling electrical or magnetic fields between pairs of electrodes such as example electrode pair 340A and 345A, in which a first electrode 340A of the pair is disposed on the first surface 311, and a second electrode 345A of the pair is disposed on the second surface 312. Apparatus 370 also is connected via a communication connection 385 to a computing device 380, which is connected via another communication connection 382 to a printing device 381. The computing device 380 and printing device 381 may be used to carry out one or more of the operations described in FIG. 1.

In general, in FIG. 3B, like elements are labeled the same as in FIG. 3A. Please refer to the description above corresponding to FIG. 3A for discussion of these elements. In FIG. 3B, the field control apparatus 370 has been activated, causing field generation pulses 361 to be transmitted via field control connections 360A and 360B to the electrodes 340 and 345 disposed on the glass 330 and 335 and establishing a potential along which the nanorods have been aligned 321. As a result of activating the electrical or magnetic field, the nanorods 321 have been dispersed through the gel 310 and aligned in overlapping groups parallel to the direction of the electrical or magnetic force in the gel. If the nanorods were left in the gel in this position, they would have relatively high conduction in the conduction direction and high insulation in other directions, but their positions in the gel would remain reversible and controllable, allowing the electrical and thermal conductivity of the gel to be rapidly adjusted.

FIG. 3B shows the nanorods 321 in straight lines. Approaches where the electrodes are repositioned, or different electrodes are used after an initial positioning step, may be used to induce more complex shapes. For example the nanorods can be positioned as illustrated in FIG. 3B with one set of electrodes, then pulled outwards with a different set of electrodes, to change the "cone shaped" splay illustrated in FIG. 3B to a curved "horn" style. Other nonlinear nanorod structures may also be achieved. In some embodiments, electric or magnetic fields may be tailored to a source side at a first angle, and arrive at the opposite side at a different angle, causing the nanorods to align along a curved line.

Figure 3C:
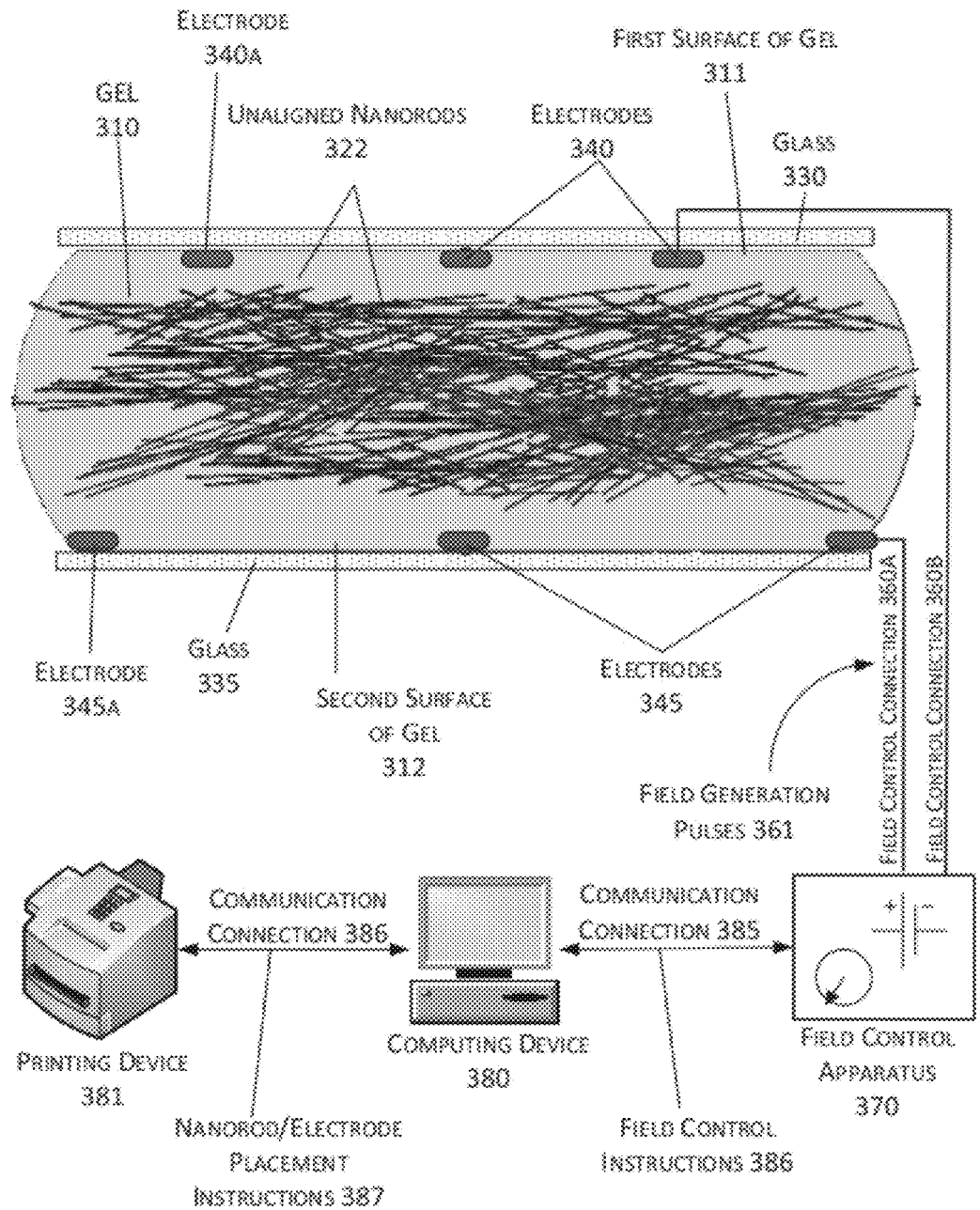
FIG. 3C is a diagram illustrating an example apparatus/method that may be used to adjust orientation of nanorods in a gel.

FIG. 3C is a diagram illustrating an example apparatus/method that may be used to adjust the thermal conductivity of a gel, in accordance with the present disclosure. FIG. 3C comprises many of the same components as FIG. 3A, including an electrophoretic gel 310 with a first surface 311 and a second surface 312, sheets of glass 330 and 335, electrodes 340 and 345, including an example electrode pair 340A and 345A, field control connections 360A and 360B which transmit field generation pulses 361, apparatus 370, communication connection 385 which transmits field control commands 386, computing device 380, communication connection 382 which transmits nanorod/electrode placement commands 387, and printing device 381. FIG. 3C also includes unaligned nanorods 322.

As in FIGS. 3A and 3B, electrodes 340 and 345 are connected via field control connections 360A and 360B to an apparatus 370 controlling electrical or magnetic fields between pairs of electrodes such as example electrode pair 340A and 345A, in which a first electrode 340A of the pair is disposed on the first surface 311, and a second electrode 345A of the pair is disposed on the second surface 312. Apparatus 370 also is connected via a communication connection 385 to a computing device 380, which is connected via another communication connection 382 to a printing device 381. The computing device 380 and printing device 381 may be used to carry out one or more of the operations described in FIG. 1.

In general, in FIG. 3C, like elements are labeled the same as in FIG. 3A. Please refer to the description above corresponding to FIG. 3A for discussion of these elements. In FIG. 3C, field control connections 360A and 360B were used to transmit field generation pulses 361 to electrodes 340 and 345, causing the placed nanorods to be aligned, and then the field generation pulses 361 were discontinued or altered to cause the nanorods to unalign 322 and re-disperse throughout the gel 310, altering the electrical and thermal conductivity of the gel 310.

FIGS. 3B and 3C together demonstrate a method for rapidly adjusting the thermal conductivity of a gel by applying electrical or magnetic fields. When the nanorods are oriented in the gel 310 as illustrated in FIG. 3B, the gel 310 may have markedly lower electrical and thermal resistance in the direction parallel to the aligned nanorods 321 than in the direction perpendicular to the aligned nanorods 321 due to conduction along the aligned nanorods 321. Thus, when a first electrical or magnetic field is applied and the nanorods are aligned, the gel 310 may have one measure of electrical and thermal resistance, whereas if for example a second electrical or magnetic field is applied causing the nanorods to re-disperse throughout the gel 310, the gel 310 may have a very different measure of electrical and thermal resistance. The second electrical field may for example comprise a field applied differently than the first field. For example, referring to FIG. 3C, if a second field is applied in the direction between electrode 340A and the right-most electrode of electrodes 345, then the aligned nanorods 321 in FIG. 3B may be broken apart.

Figure 3D:
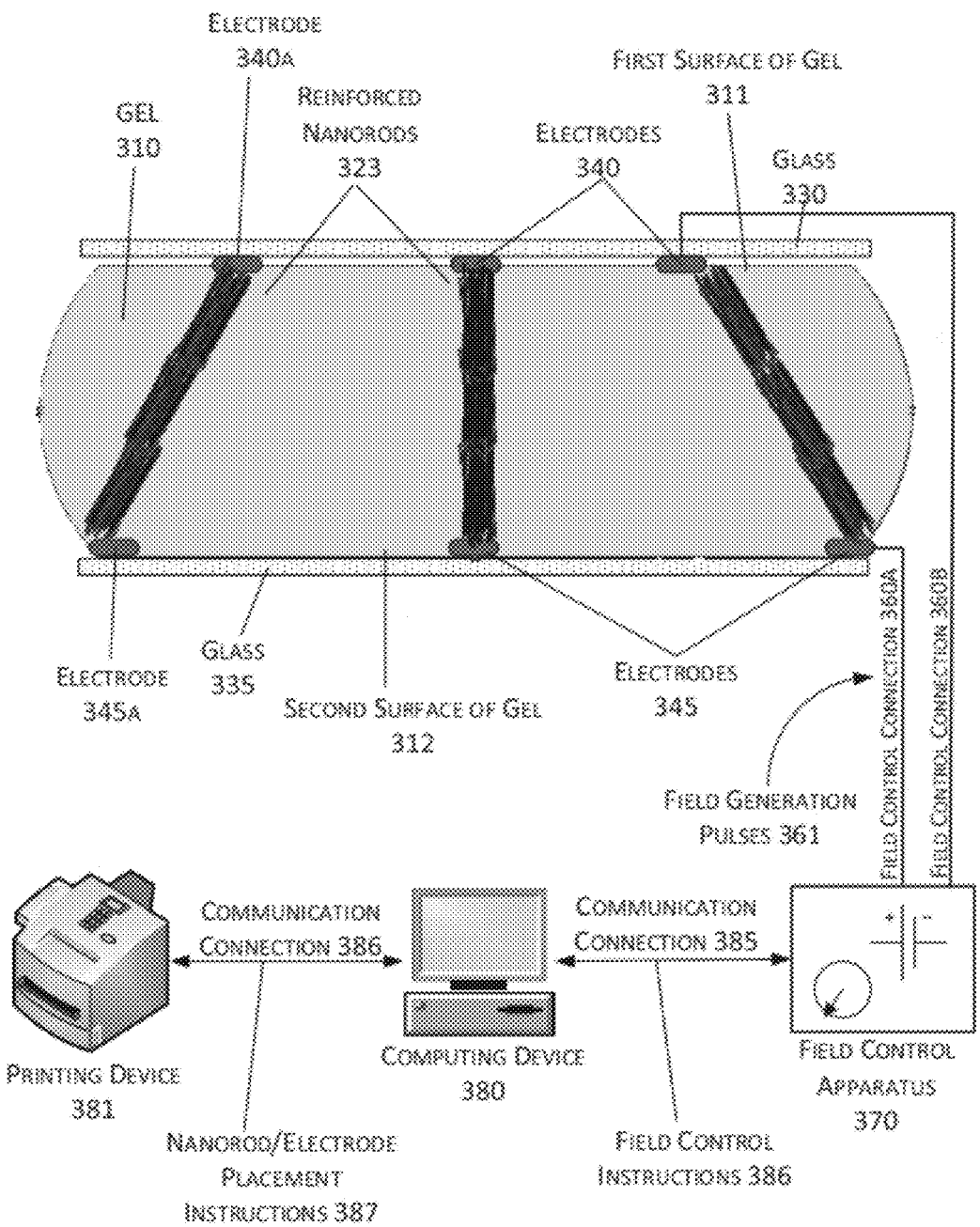
FIG. 3D is a diagram illustrating an example apparatus/method that may be used to adjust orientation of nanorods in a gel.

FIG. 3D is a diagram illustrating an example apparatus/method that may carry out one or more operations in accordance with the present disclosure. FIG. 3D contains many of the same components as FIGS. 3A-3C, including an electrophoretic gel 310 with a first surface 311 and a second surface 312, sheets of glass 330 and 335, electrodes 340 and 345, including an example electrode pair 340A and 345A, field control connections 360A and 360B which transmit field generation pulses 361, apparatus 370, communication connection 385 which transmits field control commands 386, computing device 380, communication connection 382 which transmits nanorod/electrode placement commands 387, and printing device 381. FIG. 3C also includes reinforced aligned nanorods 323.

As in FIGS. 3A-3C, electrodes 340 and 345 are connected via field control connections 360A and 360B to an apparatus 370 controlling electrical or magnetic fields between pairs of electrodes such as example electrode pair 340A and 345A, in which a first electrode 340A of the pair is disposed on the first surface 311, and a second electrode 345A of the pair is disposed on the second surface 312. Apparatus 370 also is connected via a cable 385 to a computing device 380, which is connected via another cable 382 to a printing device 381. The computing device 380 and printing device 381 may be used to carry out one or more of the operations described in FIG. 1.

In general, in FIG. 3D, like elements are labeled the same as in FIG. 3A. Please refer to the description above corresponding to FIG. 3A for discussion of these elements. In FIG. 3D, field control connections 360A and 360B were used to transmit electrical or magnetic field generation pulses to electrodes 340 and 345, causing the placed nanorods to be aligned. Communication connection 385 may have been used to transmit placement instructions from computing device 380 to printing device 381, such as instructions on where to deposit one or more bundles of nanorods on the first surface of the gel 311.

In FIG. 3D, a dendritic growth or electrodeposition process as described in FIG. 1 has been applied to the aligned nanorods, causing them to be reinforced with an additional coating of metal 323. A dendritic growth process may use a gel with dissolved metal for the process depicted in FIG. 1. In this process, applying a pulsed current to the gel 310 causes the growth of complex geometric structures that establish connections between the nanorods 323, strengthening and reinforcing them by creating a pure metal connection from one end of the bulk to the other.

A dendritic growth process may also be applied by pulling dendrites out of the nanorod material to form interconnections. This approach may cause thinning of the nanorods, leaving them capable of smaller currents.

Alternatively, electrodeposition or electroplating may be used. This process involves using electrical current to reduce positively charged ions of a desired material from the gel and coat the nanorods with a thin layer of the material. Other embodiments may involve electroless deposition, which does not require an external source of electrical current. Both electrodeposition and electroless deposition apply coatings of a generally uniform thickness without porosity and allow complex fabricated objects to be coated on both the inside and outside surfaces.

In some embodiments, a dendritic growth process may be combined with electrodeposition or electroplating. Dendrite growth may be used join rods together, and then electroplating may for example be applied after removing the gel. The dendrites hold everything together prior to the electroplating, and the electroplating then provides additional reinforcement.

Figure 3E:
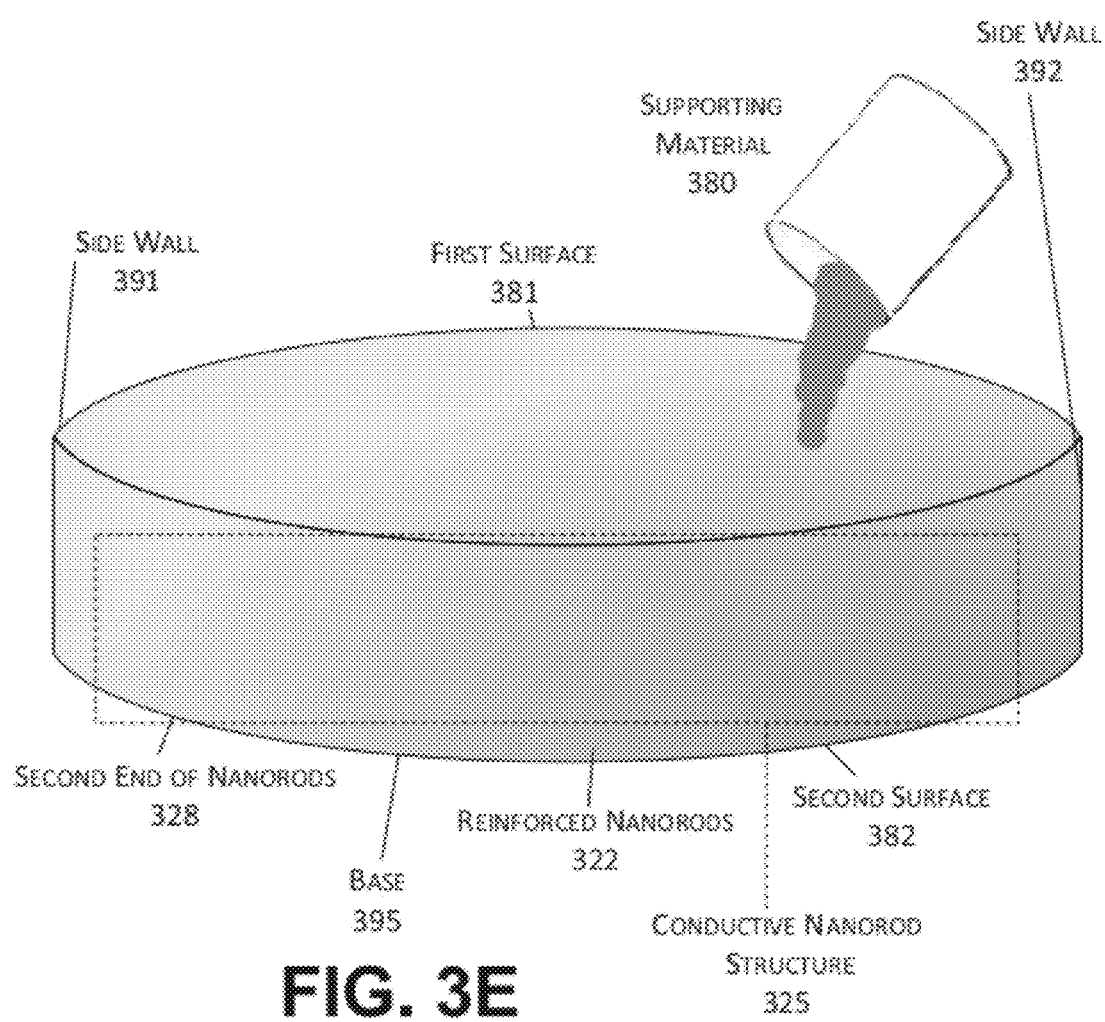
FIG. 3E is a diagram illustrating an example apparatus/method for flowing a supporting material to surround positioned nanorods.

FIG. 3E is a diagram illustrating an example apparatus/method that may carry out one or more operations in accordance with the present disclosure. FIG. 3E comprises a mold or other structure containing a base 395 and side walls 391 and 392. The structure may be of any shape. The structure contains several bundles of aligned, reinforced nanorods 322 forming a conductive nanorod structure 325, each bundle having a first end 327 and a second end 328. A supporting material 380 is being flowed into the mold, the supporting material ultimately having a first surface 381 and a second surface 382.

In FIG. 3E, the electrophoretic gel may have been removed via a sol-gel or other process, leaving in place the reinforced aligned nanorods in a conductive nanorod structure 325 and locking in a low-resistance conduction path in a preferred direction. A given nanorod structure 325 may have one or more nanorod bundles variously configured, depending on the desired product. In some embodiments, another round of dendritic growth or electroplating/electrodeposition may be performed after removal of the gel, to further connect and reinforce the aligned nanorods.

Once the nanorods have been reinforced in their desired positions, a supporting material 380, such as a light aerogel, a hard ceramic, or a flexible polymer substance, may be flowed into a mold to surround and embed the aligned nanorods, resulting in a directional conductivity nanocomposite material. The supporting material may be flowed in through a mechanical process or a manual process, depending on the substance being used and the size of the mold. A mechanical process may be controlled by a computing device, such as computing device 200 depicted in FIG. 2. The resulting directional conductivity nanocomposite material may comprise a supporting material having a first surface 381 and a second surface 382, and a conductive nanorod structure 325 disposed in the supporting material 380 (after the material 380 is flowed in), the conductive nanorod structure 325 having a first end 327 on the first surface 381 and a second end 328 on the second surface 382. The conductive nanorod structure 325 may be positioned along a substantially straight line running through the supporting material 380 (again, after the material 380 is flowed in), wherein the substantially straight line is at any angle to the first surface 381. The techniques disclosed herein may advantageously have the ability to make nanoscale conductive structures that are other than perpendicular to a first surface 381, for example, at angles between 1 and 89 degrees from perpendicular to the first surface 381. Of course, perpendicular orientation is also an option using the techniques described herein. In general, "between 1 and 89 degrees" or "between 0 and 90 degrees, exclusive" is used herein as shorthand for angles just greater than 0 degrees, or just less than 90 degrees, as discussed above.

The method described above may be used to produce a variety of applications, such as, e.g., interposer boards; packaging for integrated circuits that may distribute or separate an electrical signal while sealing a package; radio frequency or microwave circuits; or printed circuit boards. In some embodiments, the composites could be used for providing electrical traces on curved surfaces, by laying a directional conductivity composite polymer on a wing or tube. In another embodiment, shaped electrical gradients may be used to provide complex directional electrical behavior in composite materials, creating a reusable electrical template that may make an almost arbitrarily complex internally nanostructured composite. In each of these embodiments, the advantage over the prior art is that the metal lines embedded in the composite may be something other than straight through the material. Currently in the art, these materials are made by drilling through a piece of ceramic or polymer and placing metal into the drilled holes. When the hole is straight rather than angled, it is more difficult to spread electrical connections.

Figure 4:
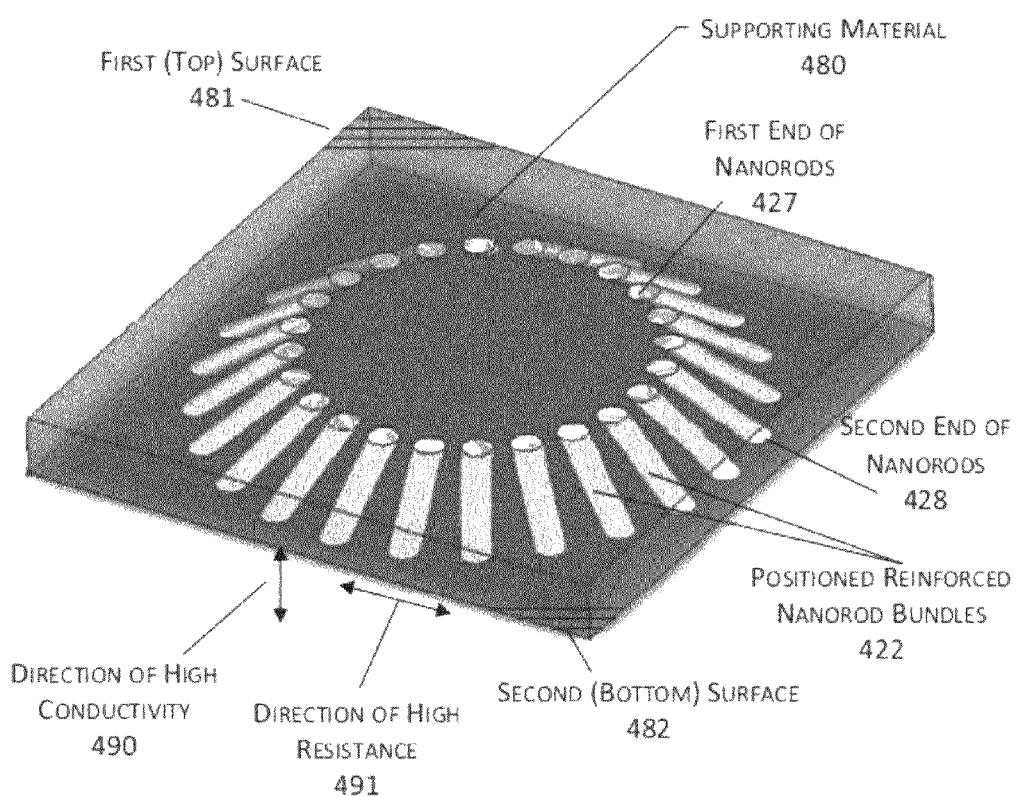
FIG. 4 is a diagram illustrating an example material produced by one or more described methods, all arranged in accordance with the present disclosure.
Figure 1:
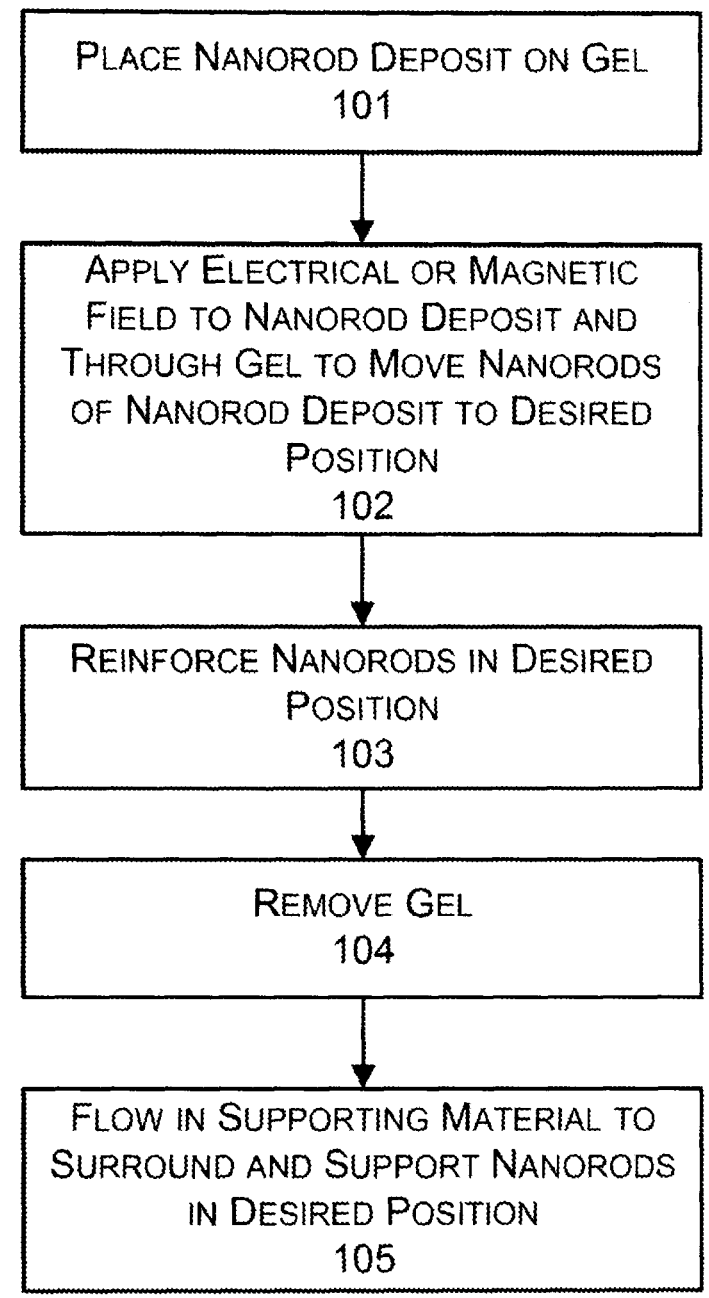

FIG. 4 is a diagram illustrating an example material produced by one or more described methods arranged in accordance with the present disclosure. The example material comprises a supporting material 480 containing a first (top) surface 481 and a second (bottom) surface 482 and a series of positioned reinforced nanorods 422, each having a first end 427 and a second end 428. The positioned nanorods 422 have increased conductivity 490 in the direction 490 parallel to the rods, and increased resistance in the direction 491 perpendicular to the rods.

The material illustrated in FIG. 4 may be used in some embodiments as an interposer, a device that allows a small wire from a microchip to connect to a larger structure, such as a computer motherboard or some other circuit board, a hybrid micro-circuit such as a multi-chip module, or a package lead frame or other structure in a microchip package. In the illustrated interposer, a circular pattern of nanorod deposits was placed on top of a gel as described in FIG. 1. A diverging field was introduced to form the nanorods into bundles of diverging straight lines 422, each bundle being at an angle between 1 and 89 degrees perpendicular to the surface of the gel. Each bundle of aligned nanorods 422 may comprise a large number of overlapping deposited nanorods. After the nanorod bundles 422 were aligned into the desired position through the application of electrical or magnetic force, dendritic growth and/or electroplating were used to enlarge and stabilize the bundles by depositing a layer of metal onto the existing structures, thereby interconnecting each bundle of rods and creating a solid metal connection from the first end of the nanorods 427 to the second end 428. The gel was then replaced with a polymer or ceramic supporting material 480 that was flowed into the interposer mold via mechanical or manual means. The resulting material, comprising a directionally conductive nanocomposite structure embedded in a solid material, has increased pitch to provide electrical separation as well as providing a solid cap.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In some embodiments, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various embodiments have been disclosed herein, other aspects and embodiments will be apparent to those skilled in art.

The invention claimed is:

1. A method for manufacturing a directional conductivity nanocomposite material, comprising:
    placing a nanorod deposit on a gel;
    applying either an electrical or a magnetic field through the gel to the nanorod deposit effective to move nanorods of the nanorod deposit to a desired position in the gel;
    reinforcing the nanorods in the desired position;
    removing the gel; and
    flowing a supporting material around the nanorods to surround and support the nanorods in the desired position effective to manufacture the directional conductivity nanocomposite material.

2. The method of claim 1, wherein placing the nanorod deposit comprises applying nanorods on the gel with a lithograph or inkjet device.

3. The method of claim 1, wherein the nanorod deposit comprises one or more of permalloy and gold nanorods.

4. The method of claim 1, wherein the gel comprises an electrophoretic gel.

5. The method of claim 1, wherein applying the electrical field comprises:
    positioning a first electrode at a first position relative to the gel about the nanorod deposit;
    positioning a second electrode at a second position relative to the gel about the nanorod deposit, wherein the first position and the second position are substantially at opposite positions relative to the gel about the nanorod deposit; and
    applying the electrical field between the first electrode and the second electrode.

6. The method of claim 1, wherein the applying the electrical field orients the nanorods parallel to a direction of the electrical field in the gel.

7. The method of claim 1, wherein the applying the electrical field comprises reversing the electrical field at least once.

8. The method of claim 1, wherein the desired position in the gel and subsequently in the supporting material comprises a position along a substantially straight line running through the gel and subsequent supporting material, and wherein the substantially straight line is at an angle between 0 and 90 degrees, exclusive, from perpendicular to a surface of the gel and subsequent supporting material.

9. The method of claim 1, wherein the reinforcing the nanorods comprises one or more of a applying a dendrite growth process and applying an electroplating process.

10. The method of claim 1, wherein the removing the gel comprises one or more of dissolving the gel by introducing a solvent and increasing pressure on the gel.

11. The method of claim 1, wherein the supporting material comprises one or more of an aerogel, a ceramic, and a polymer.

12. A method for manufacturing a directional conductivity nanocomposite material with a gel, comprising:
    applying an electrical field through the gel to move nanorods to a desired position in the gel, wherein applying the electrical field comprises:
        positioning a first electrode at a first position;
        positioning a second electrode at a second position, wherein the first position and the second position are substantially at opposite positions relative to the gel; and
        applying the electrical field between the first electrode and the second electrode, wherein the applying the electrical field orients the nanorods parallel to a direction of the electrical field in the gel;

reinforcing the nanorods in the desired position;
removing the gel; and
flowing a supporting material around the nanorods to surround and support the nanorods in the desired position effective to manufacture the directional conductivity nanocomposite material.

13. The method of claim 12, wherein the gel is a sol-gel.

14. The method of claim 13, wherein removing the gel comprises a drying process that removes the liquid phase from the gel and forms a porous material.

15. The method of claim 12, wherein the gel comprises metallic electrolytes.

16. The method of claim 12, wherein reinforcing the nanorods comprises one or more of a dendrite growth process and an electroplating process.

17. The method of claim 12, wherein the supporting material comprises one or more of an aerogel, a ceramic, and a polymer.

* * * * *

UNITED STATES PATENT AND TRADEMARK OFFICE
CERTIFICATE OF CORRECTION

PATENT NO. : 8,173,060 B2  Page 1 of 10
APPLICATION NO. : 12/426097
DATED : May 8, 2012
INVENTOR(S) : Ezekiel J. J. Kruglick It is certified that error appears in the above-identified patent and that said Letters Patent is hereby corrected as shown below:

On the Title Page, the illustrative figure should be

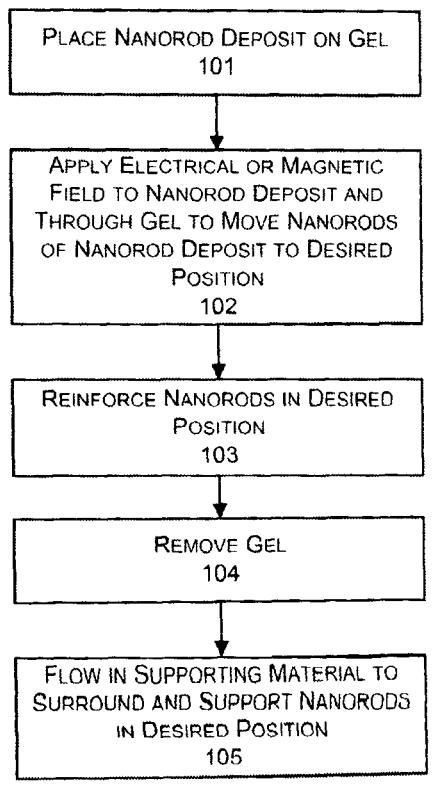

-- --

Delete Drawing Sheets 1-8 and substitute therefore the attached Drawing Sheets 1-8.

Signed and Sealed this
Thirtieth Day of October, 2012

David J. Kappos
*Director of the United States Patent and Trademark Office*

CERTIFICATE OF CORRECTION (continued)

U.S. Pat. No. 8,173,060 B2

In Column 4, Line 34, delete "0.000000" and insert -- 0.0000001 --, therefor.

In Column 6, Line 25, delete "(HDD)," and insert -- (HDDs), --, therefor.

In Column 6, Line 27, delete "(SSD)," and insert -- (SSDs), --, therefor.

In Column 6, Line 37, delete "(DVD)" and insert -- (DVDs) --, therefor.